United States Patent
Fascenda et al.

(10) Patent No.: US 9,824,239 B2
(45) Date of Patent: *Nov. 21, 2017

(54) SYSTEM FOR AND METHOD OF CRYPTOGRAPHIC PROVISIONING

(71) Applicant: KOOLSPAN, INC., Bethesda, MD (US)

(72) Inventors: Anthony C. Fascenda, Rockville, MD (US); Emil Sturniolo, Medina, OH (US); Robert Cichielo, Asbury, NJ (US); Paul Benware, Mendon, NY (US)

(73) Assignee: KOOLSPAN, INC., Bethesda, MD (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/493,100

(22) Filed: Sep. 22, 2014

(65) Prior Publication Data

US 2017/0300720 A1 Oct. 19, 2017

Related U.S. Application Data

(63) Continuation of application No. 12/324,505, filed on Nov. 26, 2008, now Pat. No. 8,842,836, which is a continuation-in-part of application No. 12/109,883, filed on Apr. 25, 2008, now abandoned, and a continuation-in-part of application No. 11/951,202, filed on Dec. 5, 2007, now Pat. No. 8,555,068.

(Continued)

(51) Int. Cl.
G06F 12/14 (2006.01)
H04L 9/14 (2006.01)
G06F 21/76 (2013.01)
H04L 9/08 (2006.01)
G06F 21/78 (2013.01)
G06F 21/72 (2013.01)

(52) U.S. Cl.
CPC ............ *G06F 21/76* (2013.01); *G06F 21/72* (2013.01); *G06F 21/78* (2013.01); *H04L 9/0897* (2013.01); *H04L 2209/80* (2013.01)

(58) Field of Classification Search
CPC ................................ G06F 21/78; G06F 21/72
See application file for complete search history.

(56) References Cited

U.S. PATENT DOCUMENTS 5,630,066 A * 5/1997 Gosling .................. G06F 8/60
                                                          709/217
5,689,563 A  11/1997 Brown et al.
(Continued)

OTHER PUBLICATIONS

International Search Report dated Apr. 3, 2008 for International Application No. PCT/US07/26441.

*Primary Examiner* — Linglan Edwards
(74) *Attorney, Agent, or Firm* — Hunton & Williams LLP

(57) ABSTRACT

A system for and method of securely provisioning a module with cryptographic parameters, such as cryptographic keys and key tables, is presented. Such modules may be used to enable encrypted communications between mobile phones to which they are coupled. The system and method prevent a malevolent individual involved in manufacturing the modules from compromising the security of the module. In particular, the modules are provisioned by an entity different from the manufacturer.

24 Claims, 7 Drawing Sheets

Related U.S. Application Data

(60) Provisional application No. 61/103,111, filed on Oct. 6, 2008, provisional application No. 61/032,196, filed on Feb. 28, 2008, provisional application No. 60/990,145, filed on Nov. 26, 2007.

(56) References Cited

U.S. PATENT DOCUMENTS

| | | | |
|---|---|---|---|
| 6,490,685 B1 | 12/2002 | Nakamura | |
| 6,577,734 B1 * | 6/2003 | Etzel | H04L 9/0822 380/273 |
| 7,133,524 B2 * | 11/2006 | Fujiwara | H04L 9/0897 331/78 |
| 7,380,131 B1 * | 5/2008 | Trimberger | H04L 9/0866 326/41 |
| 7,647,646 B2 * | 1/2010 | Nakano | G06F 21/10 380/281 |
| 7,685,435 B2 * | 3/2010 | Fujiwara | G06F 8/60 713/191 |
| 7,835,723 B2 | 11/2010 | Bjugan et al. | |
| 7,913,085 B2 | 3/2011 | Fascenda | |
| 2002/0051536 A1 | 5/2002 | Shirakawa et al. | |
| 2004/0025022 A1 | 2/2004 | Yach et al. | |
| 2004/0059921 A1 | 3/2004 | Bianchi | |
| 2005/0021961 A1 * | 1/2005 | Hanks | G06F 21/602 713/171 |
| 2005/0048971 A1 | 3/2005 | Findikli et al. | |
| 2005/0074122 A1 | 4/2005 | Fascenda | |
| 2005/0074125 A1 * | 4/2005 | Chavanne | G06F 21/10 380/278 |
| 2005/0125684 A1 * | 6/2005 | Schmidt | H04L 9/30 726/27 |
| 2006/0026417 A1 * | 2/2006 | Furusawa | G06F 21/575 713/2 |
| 2006/0085844 A1 | 4/2006 | Buer et al. | |
| 2006/0129845 A1 * | 6/2006 | Nakashima | G06F 12/1408 713/191 |
| 2006/0154695 A1 | 7/2006 | Ishibashi | |
| 2006/0195907 A1 * | 8/2006 | Delfs | G06F 21/74 726/26 |
| 2007/0165860 A1 * | 7/2007 | Handa | H04L 9/0833 380/259 |
| 2007/0230297 A1 * | 10/2007 | Kitani | G11B 20/00086 369/47.1 |
| 2008/0022084 A1 * | 1/2008 | Raftelis | H04L 63/164 713/153 |
| 2008/0046730 A1 * | 2/2008 | Han | G11B 20/00086 713/171 |
| 2008/0059790 A1 | 3/2008 | Parkinson et al. | |
| 2008/0141331 A1 | 6/2008 | Tasker et al. | |
| 2008/0222368 A1 * | 9/2008 | Gehrmann | G06F 21/572 711/152 |
| 2008/0279385 A1 * | 11/2008 | Park | G06Q 20/1235 380/278 |
| 2009/0122981 A1 * | 5/2009 | Kaji | H04L 9/302 380/45 |

* cited by examiner

SYSTEM FOR AND METHOD OF CRYPTOGRAPHIC PROVISIONING

CROSS REFERENCE TO RELATED APPLICATION

The subject application is a Continuation Application of U.S. application Ser. No. 12/324,505, filed Nov. 26, 2008, now U.S. Pat. No. 8,842,836, which claims benefit of U.S. Patent Application No. 61/103,111 filed Oct. 6, 2008 entitled "System And Method Of Cryptographic Provisioning" to Fascenda et al., and is a Continuation-in-Part of U.S. patent application Ser. No. 12/109,883 filed Apr. 25, 2008 entitled "System And Method Of Cryptographic Provisioning" to Fascenda et al., and claims benefit of U.S. Patent Application No. 61/032,196 filed Feb. 28, 2008 entitled "System For And Method Of Auto-Registration With Cryptographic Modules" to Fascenda et al., and is a Continuation-in-Part of U.S. patent application Ser. No. 11/951,202 filed Dec. 5, 2007, now U.S. Pat. No. 8,555,068 entitled "Secure Mobile Telephony" to Fascenda et al., and claims benefit of U.S. Patent Application No. 60/990,145 filed Nov. 26, 2007 entitled "Cryptographic System And Method" to Fascenda et al., the disclosures of which are hereby incorporated by reference in their entireties.

FIELD OF THE INVENTION

The present invention generally relates to a technique for provisioning a module with cryptographic parameters such as cryptographic keys.

BACKGROUND OF THE INVENTION

Hardware such as integrated circuits are frequently manufactured overseas and in insecure environments. Such hardware may be exposed to persons with malevolent intent before, during or after the manufacturing process. At such times, it may be possible to alter intended programming, insert back doors or Trojans, or otherwise compromise the integrity of the hardware.

Some Advanced Encryption Standard ("AES") algorithms, for example Galois Counter Mode ("GCM") AES algorithms, produce authentication tags in addition to being able to encrypt and decrypt data. These algorithms accept as inputs: (1) a key, (2) data to be encrypted or decrypted, (3) "additional data," which is not encrypted or decrypted, and (4) an initialization vector, also referred to as a "nonce." All inputs are accounted for in the authentication tags produced by the algorithms. Depending on whether the tags are produced by an encryption or a decryption operation, the resulting tags will be referred to herein as "encryption authentication tags" or "decryption authentication tags," respectively. Note also that regardless as to whether the tags were produced by an encryption or a decryption operation, if the encrypted or decrypted data represents the same plaintext data, if the same key and additional data are input, and if the initialization vectors correspond, then the encryption authentication tags will be identical to the decryption authentication tags. Otherwise, the tags will not match. Thus, the authentication tags are essentially a signature on the encrypted or decrypted data (as appropriate) that also takes into account the key used for the encryption operation, the additional data and the nonce.

Summary of Certain Embodiments of the Invention

According to an embodiment of the present invention, a method of provisioning a module with cryptographic parameters, where the module includes a first nonvolatile memory, a second nonvolatile memory and a processor, is disclosed. The method includes storing a first cryptographic key in at least one of the first nonvolatile memory and the second nonvolatile memory. The method also includes storing a first program encrypted using the first cryptographic key in at least one of the first nonvolatile memory and the second nonvolatile memory, where the first program is configured to: generate, within the module and using the processor, a second cryptographic key and a third cryptographic key, encrypt, within the module, the second cryptographic key using the third cryptographic key, whereby encrypting the second cryptographic key with the third cryptographic key generates an encrypted second cryptographic key and a first authenticator, store, within the first nonvolatile memory, the encrypted second cryptographic key and the first authenticator, and store, within the second nonvolatile memory, the third cryptographic key.

Various optional features of the embodiment described in the above paragraph include the following. The method may include that the first nonvolatile memory and the second nonvolatile memory are logically partitioned portions of a single physical persistent memory. The method may include storing in the module additional programming, encrypted using the second cryptographic key. The method may include, when the module is activated, decrypting, within the module, the encrypted second cryptographic key, whereby decrypting the encrypted second cryptographic key generates a second authenticator, comparing the first authenticator and the second authenticator, and disabling at least some operations of the module if a result of the comparing indicates a lack of authenticity. The method may include that the module lacks a power supply. A form factor for the module may be one or more of: SD, mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and USB. The method may include, prior to the step of storing a first cryptographic key, receiving the module, where the received module includes a test program and a test key, where the test program and test key are configured to test that the module has been correctly manufactured. The method may include accessing a public key associated with an entity, encrypting a symmetric key using the public key, whereby an encrypted symmetric key is generated, transmitting the encrypted symmetric key to the entity, receiving, from the entity, at least one key encrypted with the symmetric key, and decrypting, within the module, the at least one key. The method may include encrypting the at least one key using the second cryptographic key, whereby an encrypted symmetric key is generated, and storing the encrypted symmetric key in the second nonvolatile memory.

According to an embodiment of the present invention, a system for provisioning a module with cryptographic parameters, where the module includes a first nonvolatile memory, a second nonvolatile memory and a processor, is presented. The system includes means for storing a first cryptographic key in at least one of the first nonvolatile memory and the second nonvolatile memory. The system also includes means for storing a first program encrypted using the first cryptographic key in at least one of the first nonvolatile memory and the second nonvolatile memory, where the first program is configured to: generate, within the module and using the processor, a second cryptographic key and a third cryptographic key, encrypt, within the module, the second cryptographic key using the third cryptographic key, whereby encrypting the second cryptographic key with the third cryptographic key generates an encrypted second cryptographic key and a first authenticator, store, within the first nonvolatile memory, the encrypted second cryptographic key and the first authenticator, and store, within the second nonvolatile memory, the third cryptographic key.

Various optional features of the embodiment described in the above paragraph include the following. The system may include that the first nonvolatile memory and the second nonvolatile memory are logically partitioned portions of a single physical persistent memory. The system may include storing in the module additional programming, encrypted using the second cryptographic key. The system may include that the first programming is further configured to, when the module is activated, decrypt, within the module, the encrypted second cryptographic key, whereby decrypting the encrypted second cryptographic key generates a second authenticator, compare the first authenticator and the second authenticator, and disable at least some operations of the module if a result of the comparing indicates a lack of authenticity. The system may include that the module lacks a power supply. A form factor for the module may be one or more of: SD, mini SD, micro SD, PCMCIA, P2, Compact Flash, Memory Stick, PRO Memory Stick, PRO Duo Memory Stick, Micro Memory Stick, Multi Media Card, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, SIP, DIP and USB.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF EMBODIMENTS

Figure 1:
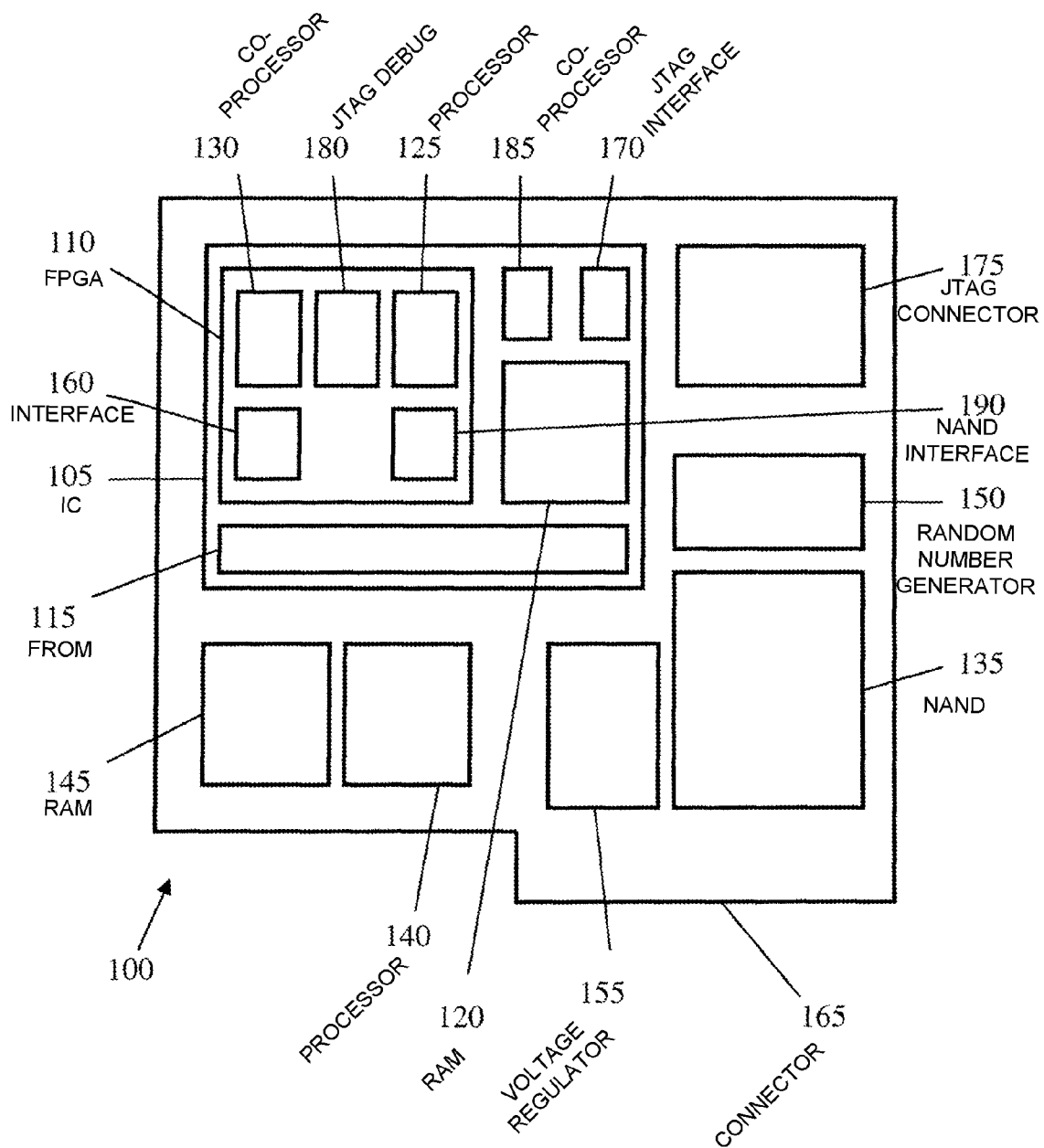
FIG. 1 is a schematic diagram of a module according to an embodiment of the present invention.

A description of certain embodiments of the present invention may be understood by referring to FIGS. 1 through 7, wherein like reference numerals refer to like elements, and are generally described in the context of a remote access network.

According to some embodiments of the present invention, a system for and method of provisioning a cryptographic module are presented. An exemplary module is discussed in detail in reference to FIG. 1. Some embodiments of the module take the form of a smart card, such as a micro Secure Digital card, but include functionality in addition to nonvolatile (i.e., persistent) memory. Modules according to certain embodiments of the present invention are configured to be operably coupled to, for example, computers or mobile phones. When coupled to a mobile phone, some embodiments of the present invention work together with associated software to allow such a phone to place and receive end-to-end encrypted voice calls. This functionality is disclosed in detail in U.S. Utility patent application Ser. No. 11/951,202 entitled "Secure Mobile Telephony" to Fascenda et al., the disclosure of which is incorporated by reference. Thus, modules according to certain embodiments of the present invention assist in providing encrypted communications and accordingly store cryptographic parameters, such as cryptographic keys.

Certain embodiments of the present invention include techniques for securely provisioning modules with cryptographic parameters, such as cryptographic keys. More particularly, certain embodiments of the present invention provide techniques for provisioning modules in a manner that avoids or minimizes the possibility of malevolent individuals involved in the manufacturing or programming processes compromising the modules' security. Some embodiments accomplish this goal by provisioning the modules after they have been manufactured in a way that detects, destroys, replaces or ignores problematic data that previously existed in the module. Thus, for example, modules according to certain embodiments of the present invention may be manufactured in a relatively insecure facility and then transferred to a secure facility for provisioning with cryptographic parameters without compromising the security of the cryptographic parameters.

Some embodiments of the present invention allow for securely provisioning by assigning different tasks to different entities. The following six paragraphs present an overview of an exemplary provisioning process for some exemplary embodiments, but should not be taken as limiting. Initially, a manufacturer creates one or more integrated circuits in a semiconductor fabrication facility. Such integrated circuit(s) contain basic infrastructure upon which programming is later installed. Note that at this stage, the integrated circuit(s) are essentially just fabricated semiconductor slabs lacking connectors. A second manufacturer, which may be the same entity as the first manufacturer, then mills the integrated circuit(s) to reduce their thicknesses and assembles them into a secure module having the desired form factor, such as a Secure Digital card, discussed below in reference to FIG. 1.

Next, an entity referred to as the "test programming programmer," which may be the same as the first or second manufacturer, a base provisioning entity, or another entity, programs the module with encrypted test programming and associated cryptographic keys supplied by the base provisioning entity, such that the module can only be reprogrammed by an entity that knows at least one of the cryptographic keys. This process is discussed in detail below in reference to FIG. 2. More particularly, the base provisioning entity encrypts the test programming using a cryptographic key, referred to as the "test programming key."

The encryption operation, which is performed using equipment external to the module, generates an encryption authentication tag (i.e., a signature) for the programming. The base provisioning entity rolls the encrypted test programming into a installation file that includes the encryption authentication tag in its header. The base provisioning entity supplies the test programming programmer with the test programming installation file together with the test programming key and a lock key. When installed, the lock key locks the module from being programmed unless the lock key is supplied. The test programming programmer installs the test programming key and the lock key into the module.

The test programming programmer then proceeds to install the test programming file into the module, supplying the lock key in order to do so. When the module is programmed with the encrypted test programming, the module internally decrypts the associated file using the installed test programming key. This internal decryption generates a decryption authentication tag, which the module internally compares with the encryption authentication tag contained in the file header. If the tags do not match, then the test programming programmer knows that one or both of the test programming key and the test programming have been altered or corrupted, the process is stopped, and the module is set aside. Otherwise, the test programming programmer tests the module by executing the test programming, which verifies that the module is free from manufacturing flaws and tampering. The test programming programmer may then erase the test programming and the test programming key and may reset or erase the lock key. Alternately, the test programming programmer may leave one or both of (1) the test programming and test programming key, or (2) the lock key installed in the module.

Modules that pass the test may be retained by the same entity, or transferred to either the base provisioning entity or another provisioning entity. The entity in possession of the module at this stage is referred to as the "key generation programming programmer." The key generation programming programmer installs additional provisioning material supplied by the base provisioning entity. This process is described below in reference to FIG. 2. If the test programming is still present in the module, the key generation programming programmer may re-run the test programming and again test the module. Once the test, if any, is successfully completed, the key generation programming programmer proceeds with its installation tasks. In particular, the key generation programming programmer has access to encrypted key generation programming and the cryptographic key used to encrypt it, both of which may be supplied by the base provisioning entity. The encrypted key generation programming includes a header, which contain an encryption authentication tag for the encrypted key generation programming. The key generation programming programmer also has access to the currently-installed lock key, if any. If no lock key is currently installed, the key generation programming and general operation programming programmer may install a random lock key. The key generation programming programmer then installs the key generation programming encryption key and the key generation programming, supplying any necessary lock key in the process. During installation, the module internally decrypts the key generation programming using the installed key generation programming encryption key. The decryption generates a decryption authentication tag, which is compared with the associated encryption authentication tag in the encrypted key generation programming header. If the comparison fails, then one or both of the key generation programming and key generation programming encryption key are assumed to have been tampered with or corrupted, and the module is set aside. Otherwise, modules that pass the test are passed to the next stage in the provisioning process. At this stage, the key generation programming programmer may transfer the module to a different provisioning entity, such as the base provisioning entity, or retain the module in order to conduct the next step in the process. If transferred, the key generating programming entity provides to the transferee the lock key, but not the key that encrypts the key generation programming.

Figure 2:
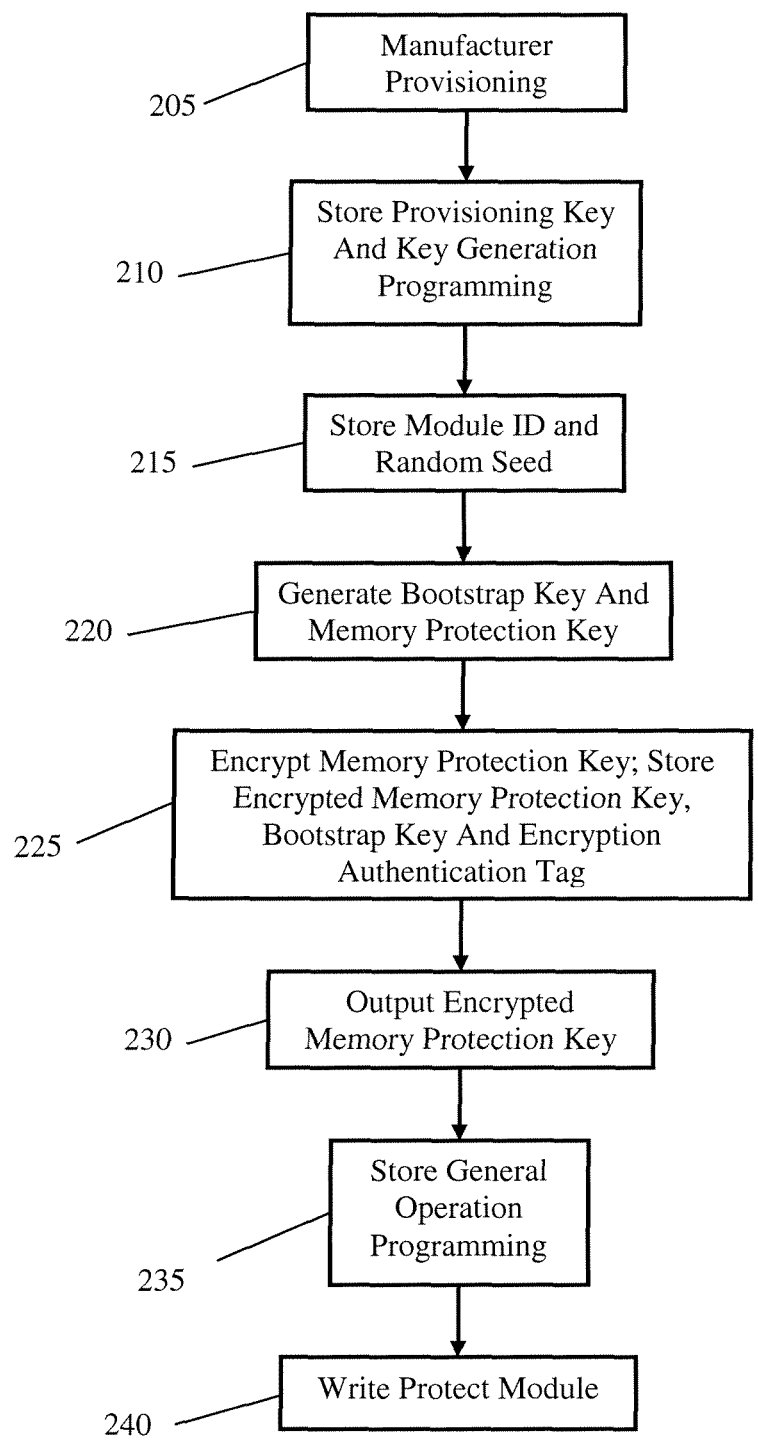
FIG. 2 is a flowchart depicting initial module provisioning according to an embodiment of the present invention.

At the next stage, the entity in possession of the module executes the key generation programming, which generates certain cryptographic parameters internally within the module as described in detail in reference to FIG. 2. The key generation programming stores these parameters within the module as detailed herein. Note that no entity, not including the base provisioning entity, the key generation programming programmer, nor the general operation programming programmer, has access to certain internally-generated and stored cryptographic parameters such as the memory protection key, which is described in detail below. Instead, certain cryptographic parameters are generated and encrypted entirely within the module and never leave the module in unencrypted form. At this stage, the module may be passed to another provisioning entity or retained by the entity that executes the key generation programming. If transferred, the receiving entity also receives the lock key.

Next, the entity in possession of the module replaces the key generation programming with encrypted general operation programming, which is supplied by the base provisioning entity. To do so, the entity in possession of the module, referred to as the "general operation programming programmer" first installs the cryptographic key that is used to encrypt the general operation programming. The general operation programming programmer also inputs a lock key in order to install the general operation programming. As with the key generation programming, the installation process validates the general operation programming by comparing an internally generated authentication tag with an authentication tag in the header of the general operation programming installation file. If the comparison fails, the module is set aside. Otherwise, the general operation programming is made permanent, and external access to certain internally-stored parameters in unencrypted form is forever prevented, as detailed herein. The lock key is thereafter useless, as the general operation programming cannot be altered. In some embodiments, the general operation programming programmer sets the lock key to a random value, which is not recorded by the general operation programming programmer or any other entity. The module is then passed to another entity, or retained by the general operation programming programmer, in order to execute the general operating fabric and complete the basic provisioning process.

The entity now in possession of the module executes the general operation programming to provision the module with additional cryptographic parameters. This provisioning process, in general, makes use of the cryptographic parameters generated by the key generation programming as discussed below in detail in reference to FIGS. 3-7.

FIG. 1 is a schematic diagram of a module according to an embodiment of the present invention. Module 100 is depicted in FIG. 1 as being provisioned with various features as explained below in reference to FIGS. 2-6. Module 100 may take the form factor of a standard memory card. Exemplary form factors include, by way of non-limiting example, Secure Digital ("SD"), mini SD, micro SD, PCM-CIA, P2, Compact Flash, Memory Stick, PRO Memory Stick, PRO Duo Memory Stick, Micro Memory Stick, SmartMedia Memory Card, MultiMedia Memory Card, Reduced Size MultiMedia Memory Card, MultiMedia Memory Card Mobile, MultiMedia Memory Card Plus, MultiMedia Memory Card Micro, xD Memory Card, USB, single in-line package ("SIP") and dual in-line package ("DIP"). Other form factors are also possible.

Module 100 includes an integrated circuit 105 that itself may include a Field Programmable Gate Array ("FPGA") 110, a Flash Read Only Memory ("FROM") 115 (a type of nonvolatile memory), a Random access Memory ("RAM") 120, a processor 125, a cryptographic co-processor 130 and a Joint Test Action Group ("JTAG") debug module 180. An exemplary integrated circuit that includes many features of integrated circuit 105 is a ProASIC3L series A3P1000, available from ACTEL of Mountain View, Calif., U.S.A. This integrated circuit may be implemented as integrated circuit 105 in certain embodiments of the present invention.

One or more of features 125, 130 and 180 may be programmed into FPGA 110 or elsewhere. By way of non-limiting example, one or more of processor 125, cryptographic co-processor 130 and JTAG debug module 180 may be dedicated circuitry that is fabricated on the same semiconductor block as FPGA 110, on a different semiconductor block or blocks, or may be implemented in FPGA 110 itself by programming FPGA 110 with suitable "fabric," discussed below. By way of non-limiting example, processor 125 may be an ARM Cortex-M1 CPU, which is available from Mentor Graphics Corp. of Wilsonville, Oreg., U.S.A. The ARM Cortex-M1 CPU may be programmed into any FPGA. By way of non-limiting example, cryptographic co-processor 130 may be an Advanced Encryption Standard ("AES") Rijndael Galois Counter Mode ("GCM") co-processor. That is, cryptographic co-processor 130 may be configured to encrypt, decrypt and authenticate data using AES-GCM algorithms.

Module 100 can store essentially two different forms of data, which are referred to herein as "fabric" and "executables," respectively. Note that the difference between these types of data are essentially how the data are used, rather than how the data are stored. Both fabric and executables are referred to herein collectively as "programming." Fabric may perform functions that are typically associated with hardware. An example of such fabric is the ARM Cortex-M1 CPU, discussed above. Examples of executables are presented below in reference to FIG. 2. In general, fabric may be programmed into FPGA 110, and executables may be stored in NAND flash memory 135. Note that executables may be transferred to one or both of RAM 145 and RAM 120 for execution. In some embodiments, executables are stored in encrypted form in NAND flash memory 135, then transferred to RAM 120, where they are executed by fabric such as a Cortex-M1 CPU present in FPGA 110.

Programming FPGA 110 may be protected in at least two ways. First, as discussed in detail herein, programming may be encrypted using an encryption algorithm and a key. Without the key, programming is essentially useless. This form of protection may be used for both fabric and executables, and each may be separately encrypted using the same or different keys. In some embodiments, the key is stored in distributed form in FPGA 110. Second, programming may be protected by a native programming protection apparatus. This protection works by preventing any FPGA programming unless a cryptographic key known as a "lock key" is first input. ACTEL's ProASIC3L series of integrated circuits utilize such a lock key protection mechanism, known as "FLASHLOCK." The lock key may protect both FPGA 110 and FROM 115 from being altered or read without first providing the key. In some embodiments, the lock key is stored in distributed form in FPGA 110. The second form of protection is also suitable for both fabric and executables.

FPGA 110 and FROM 115 have the ability to permanently store data; that is, data stored on FPGA 110 and FROM 115 may be made permanent. To that end, and by way of non-limiting example, antifuse technology may be used, such as ACTEL's FuseLock technology available on ACTEL's ProASIC3L series of integrated circuits. Once such antifuses are blown, in such embodiments, the contents of FPGA 110 and FROM 115 cannot be modified.

Module 100 includes further portions 135-160, which may reside on integrated circuit 105, or on a different integrated circuit or circuits as depicted in FIG. 1. Module 100 includes a NAND flash memory 135. In certain embodiments, other types of persistent memory may be used, such as by way of non-limiting example, NOR flash memory or Electrically Erasable Programmable Read Only Memory ("EEPROM"). NAND flash memory 135 is controlled via NAND flash memory interface 190. NAND flash memory interface 190 may reside on integrated circuit 105 or on a different integrated circuit or circuits. NAND flash memory interface 190 may be programmed into FPGA 110. As described in detail below, NAND flash memory 135 may be segmented into at least two logical portions, each of which configured to store encrypted or plaintext (i.e., unencrypted) data. That is, NAND flash memory 135 may be logically partitioned into two separate nonvolatile memories, one of which is intended to store information that is meant to remain internal to the module, and the other of which is intended to store information that may be accessible outside the module. Module 100 further includes a processor 140 and RAM 145. Module 100 further includes random number generation block 150. Random number generator block 150 may include a true random number generator, which may use a probabilistic physical phenomenon such as thermal noise, radio frequency noise, video noise, etc. to generate random numbers. Random number generator block 150 may include, in addition or in the alternative, a pseudorandom number generator, such as a linear feedback shift register circuit or a deterministic random bit generator. Voltage regulator 155 serves to protect internal circuitry and regulate voltage where needed. Module 100 is configured to communicate with other electronic devices using interface 160, which may be, by way of non-limiting example, a SD interface or a universal asynchronous receiver-transmitter ("UART") interface, and via physical connector 165, which may be, by way of non-limiting example, a connector that conforms to the microSD standard. Interface 160 may be programmed into FPGA 110.

Module 100 also includes a JTAG interface 170, which is coupled to JTAG physical connectors 175 and to JTAG debug module 180. JTAG interface may reside on integrated circuit 105, in FPGA 110, or on a different integrated circuit or circuits. Note that JTAG interface 170 and JTAG physical connectors 175 may conform to Institute of Electrical and Electronics Engineers ("IEEE") Standard 1149.1. In some embodiments, JTAG physical connectors 175 are located on the face of a micro SD card. In such embodiments, JTAG physical connectors 175 may be covered by an adhesive label once FPGA 110 is finally programmed. In some embodiments, the FPGA 110 is programmable only via JTAG physical connectors 175.

In some embodiments, JTAG interface 170 may be disabled by internal programming present in, e.g., FROM 115, NAND 135 or FPGA 110. Embodiments that include this feature may remove access to the programming capabilities of FPGA 110 by disabling (e.g., disconnecting) JTAG interface 170. Once JTAG interface 170 is disabled, the internal components of module 100 are no longer addressable or programmable via JTAG debug module 180. Disabling JTAG interface 170 provides added security to module 100 at least because it blocks off possible point of attack, namely attack via JTAG interface 170 or JTAG debug module 180.

JTAG interface 170 may be disabled by setting a register or signal to a particular state or level. For example, disabling JTAG interface 170 may be accomplished by use of an internal register or electrical signal that is accessible only from within an operational part of module 100 (e.g., FPGA 110). For operational parts programmed with this capability, the operational pattern or executing firmware may assert a specific value to the addressable register, or set the level of the signal the next time the chip is power cycled or reset. The value or signal may be held in persistent FPGA programming (e.g., a portion of a pattern), in persistent storage (e.g., FROM 115 or NAND 135), or in volatile memory (e.g., RAM 145 or RAM 120). For values or signals held in volatile memory, the relevant state may be repopulated upon start up of module 100. Once set, the value or signal may continue in perpetuity, acting as a one-way lock, which cannot be undone.

The one-way lock on JTAG interface 170 may disconnect JTAG interface 170 from one or both of JTAG physical connector 175 and JTAG debug module 180. Such embodiments may electrically disconnect signals to and from JTAG interface 170 via one or more electronic gates. That is, the internally-held register state or signal level may cause one or more gates (e.g., AND gates in FPGA 110) to electrically disconnect JTAG interface 170 from other internal components of module 100 (e.g., JTAG physical connectors 175 or JTAG debug module 180). In one embodiment, a low signal level indicates a disconnection, which is accomplished by feeding the low signal into one or more AND gates, which connect JTAG interface 170 to JTAG physical connectors 175. With one input to the AND gate(s) held low, no signals may pass.

In some embodiments, JTAG interface 170 is coupled to AES cryptographic co-processor 185, which may be distinct from cryptographic co-processor 130. In such embodiments, all programming that is to be stored in FPGA 110 (by way of non-limiting example, fabrics) must be encrypted external to module 100 prior to installation in module 100. In particular, the encrypted programming is wrapped into a file with a header that includes an associated encryption authentication tag. In such embodiments, the associated encryption key is installed in module 100 prior to installing the programming. During installation, the programming is passed through JTAG interface 170, decrypted by cryptographic co-processor 185, and its decryption authentication tag is internally compared to the encryption authentication tag stored in the encrypted programming file header. If the match fails, the programming is not installed.

In some embodiments, each feature 105-150, 160, 170 and 180 is connected only to FPGA 110. In such embodiments, any signal received at connector 165 is routed through interface 160 to FPGA 110. Thus, for example, in such embodiments, programming present in FPGA 110 acts as a gatekeeper between physical connector 165 and NAND flash memory 135. In other embodiments, each feature 105-180 may be operatively coupled to any other feature 105-180. In certain embodiments, the module lacks an internal power supply.

Note that FROM 115 may be protected by several security features. In some embodiments, FROM 115 is writable only through JTAG connectors 175. In such embodiments, FROM 115 may not be written to via physical connectors 165. Further, in such embodiments, FPGA 110 cannot write to FROM 115. Thus, in some embodiments, the only way to alter the contents of FROM 115 is via JTAG connectors 175, prior to the data stored on FROM 115 being made permanent.

In some embodiments, at least a portion of FROM 115 is only internally readable. That is, in such embodiments, at least some of the contents of FROM 115 may not be read via physical connectors 165. In such embodiments, at least some of the contents of FROM 115 may only be read via JTAG physical connectors 175 prior to the contents of FROM 115 being made permanent. Thus, once the contents of FROM 115 are made permanent, such contents cannot be read via physical connectors 165 or JTAG physical connector 175. Furthermore, in some embodiments, only programming executing in processor 125 can access the entire contents of FROM 115. In such embodiments, therefore, the contents of FROM 115 are only accessible to internal logic of module 100 and cannot be accessed externally. In other embodiments, programming executing in processor 140 may have access to the entire contents of FROM 115.

In some embodiments, a portion of FROM 115 remains readable via physical connectors 165 even after the contents of FROM 115 are made permanent. For example, as discussed below, FROM 115 may store an ID for module 100. In such embodiments, the module ID may be read out of FROM 115 via physical connectors 165 even after the contents of FROM 115 are made permanent. In such embodiments, the remaining contents of FROM 115 (e.g., other than the module ID) may not be readable via physical connectors 165.

In some embodiments, FPGA 110 (or more generally module 100) includes a secure writable persistent storage that is only internally readable by a specially programmed fabric. The contents of such storage persist between programming steps. For example, a first fabric may generate a data (e.g., a cryptographic key or random number) and store such data in the protected persistent storage area. A subsequently programmed fabric may have the ability to read this data. Such persistent storage may be implemented in FPGA 110, FROM 115, NAND 135, or an additional ROM, NAND, NOR, Bubble, or other memory present in module 100. The persistent storage may not be cleared even if module 100 is power cycled. Its contents may be cleared by a command from the external interface, but not read directly, thus maintaining its stored data. A particular value (all zeros for instance) might indicate a cleared state. (Note that in some embodiments, a JTAG-disabling state or signal may be held in such a persistent memory.) Some embodiments include a static or dynamic RAM (e.g., RAM 120 or RAM 145), whose contents persist as long as power is applied.

In some embodiments, module 100 is configured to be tamper resistant. For example, module 100 may be fabricated using chemical-resistant potting material, which cannot be etched away from the internal circuitry. The contents of module 100 may be shielded by one or more (e.g., seven) metallic layers. Such layers greatly increase the difficulty of milling away the module's potting material. Some or all of integrated circuits in module 100 (e.g., integrated circuit

105, FPGA 110, RAM 120, NAND flash memory 135, processor 140, RAM 145, random number generator block 150, voltage regulator 155, interface 160, JTAG interface 170, JTAG debug module 180, and cryptographic co-processor 185) may be milled to reduce their thickness. By way of non-limiting example, such elements may be milled to a thickness of less than: 100 micrometers ("µm"), 75 µm, 50 µm, 25 µm or 10 µm. Note that the actual operational portion of a typical integrated circuit is only about ten angstroms ("Å") thick. Accordingly, in some embodiments, some or all of the aforementioned integrated circuits may be milled to a thickness of less than, by way of non-limiting example, 100 Å, 50 Å, 25 Å or 10 Å. Thin integrated circuits are tamper resistant due to their increase fragileness. For example, attempts to tamper with module 100 may result in damaging one or more integrated circuits contained therein.

FIG. 2 is a flowchart depicting initial module provisioning according to an embodiment of the present invention. At block 205, a test programming programmer provisions the module with certain data. For example, the test programming programmer stores a lock key and a test programming fabric key in module 100, by way of non-limiting example, in FPGA 110 in distributed form. Once the lock key is installed, FPGA 110 may only be reprogrammed by someone with knowledge of the lock key. The test programming programmer programs FPGA 110 with test programming fabric, which is externally encrypted with the test programming fabric key. More particularly, the test programming programmer creates a file containing a copy of the test programming fabric encrypted using the test programming fabric key. The file also contains a header, which includes a copy of the associated encryption authentication tag. The test programming programmer then installs the file in module 100, which utilizes cryptographic co-processor 185 and the stored test programming fabric key to decrypt the test programming fabric and generate a decryption authentication tag. That tag is compared with the encryption authentication tag contained in the header, and if the two tags do not match, the programming halts. Otherwise, the decrypted test programming fabric is stored in FPGA 110.

In addition, the test programming programmer stores an encrypted test programming executable in NAND flash memory 135 and the associated test programming executable encryption key in module 100 (e.g., in FPGA 110, FROM 115 or NAND flash memory 135). Note that without access to the test programming executable key, it is not possible to read or modify the test programming executable in any useful way. Because module 100 includes cryptographic co-processor 140 and the test programming key, it is able to internally decrypt the test programming executable and transfer it to RAM 145 or RAM 120 for execution by the test programming fabric stored in FPGA 110. In some embodiments, the test programming executable is not encrypted. In such embodiments, the associated test programming executable key is omitted.

In some embodiments, the test programming fabric includes the following, each of which is implemented in FPGA 110. The test programming fabric may include an ARM Cortex-M1 CPU (e.g., as, instead of, or in addition to, processor 125), a JTAG debug module (e.g., JTAG debug module 180), an interface connecting to NAND flash memory 135, an interface connecting to RAM 145 and a general purpose interface to physical connector 165 (e.g., as, or in addition to, interface 160).

The test programming programmer generally uses external equipment to program and, together with the test programming, to test the modules it manufacturers. In some embodiments, the manufacturer utilizes a JTAG fixture, such as a FlashPro3 device, available from ACTEL of Mountain View, Calif., U.S.A. The test programming programmer may also employ loopback provisions for testing the modules. That is, the test programming programmer may feed signals generated by a module back to the module in order to detect problems with, e.g., physical connectors 165.

The test programming programmer uses the test programming fabric and executable to run diagnostic processes on the module in order to ensure that is has been correctly manufactured without flaws or tampering. Testing may occur via one or both of physical connector 165 and JTAG physical connector 175. One such test includes testing RAM 145, including a data bus test for shorts and opens, an address uniqueness test, and a test of high and low states of every bit. The RAM 145 test may be somewhat limited by the test programming's usage of RAM 145. Yet another test includes testing the interface to NAND flash memory 135 and verifying that fundamental operations (e.g., reading module ID registers) are working correctly. Yet another test includes counting the number of blocks in NAND flash memory 135 that are bad, verifying that block zero is functional, and verifying that the total number of bad blocks is not excessive. Yet another test verifies that the physical connections from FPGA 110 to physical connector 165 are sound by utilizing loopback provisions in the manufacturer's test fixture. If the module passes each test, the test programming programmer sends it to the provisioning entity. In some embodiments, the test programming programmer sends all manufactured modules, whether the test results are successful or not, to the key generation programming programmer or the base provisioning entity.

The test programming programmer then sends at least the operational modules to a key generation programming programmer. The test programming programmer may erase the test programming and associated keys, or may send the modules on as-is. The test programming programmer may re-run one or more tests available from the test programming once it receives the modules.

At block 210, the key generation programming programmer stores key generation programming in module 100. The key generation programming is intended to be used once in order to generate two keys, as discussed in detail below. In some embodiments, the key generation programming programmer stores key generation programming fabric in FPGA 110 in essentially the same way that the test programming programmer stored the test programming fabric in FPGA 110. That is, the key generation programming programmer may first store a key generation programming fabric key in module 100, e.g., in FPGA 115 in distributed form, inserts encrypted key generation programming fabric into FPGA 115, and a comparison between associated authentication tags is performed. In some embodiments, the key generation programming fabric key replaces the test programming fabric key, and the key generation programming fabric overwrites the test programming fabric. Alternately, in some embodiments, the key generation programming fabric is identical to the test programming fabric that is already present in FPGA 110 at this stage. The key generation programming programmer also stores an encrypted key generation programming executable in NAND flash memory 135 and the associated key generation programming executable key in module 100 (e.g., in FPGA 110, FROM 115 or NAND flash memory 135).

Note that the key generation programming programmer may need to supply the lock key in order to be able to program FPGA 110. If the supplied lock key fails to unlock FPGA 110 for programming, the module may immediately join the other modules (if any) that failed any previous test. Alternately, the module may be tested to determine if the module hardware is flawed or if its programming or keys have been tampered with. For example, the module may be re-programmed with the test programming. If the test programming operates normally after this re-programming, then it is likely that the initially-installed test programming had been tampered with or corrupted. The module may then join the other modules (if any) that failed any previous test.

At block 215, the key generation programming programmer stores a unique module identification ("ID") and random number seed in FROM 115. By way of non-limiting example, the random number seed may be 256 bits long and contain 256 bits of entropy, and the module ID may be sixteen bytes long. The module ID may include a hardware serial number and a manufacturing date.

At block 215, the key generation programming executes to generate a bootstrap key and a memory protection key. These keys may be, by way of non-limiting example, 256-bit GCM-AES keys. The generation of these keys may involve using the random number seed stored in FROM 115 as a seed value for a pseudorandom number generator that forms part of random number generator block 150. The pseudorandom number generator may generate pseudorandom numbers that may be used as keys or passed through a hashing algorithm to generate the two keys. Alternately, or in addition, random number generator block 150 may itself generate true random numbers that may be used as the two keys or passed through a hash algorithm to generate the two keys. Alternately, generated random numbers may be combined with one or more input random numbers using a mixing function, such as XOR. An alternate mixing function that may be used is the GCM-AES encryption algorithm, which may accept random or pseudorandom numbers as any, or a combination, of the encryption key for the algorithm, the plain text to be encrypted, and the nonce (i.e., the initialization vector). The resulting data generated by the encryption algorithm may then be used as the final key or keys.

At block 225, the key generation programming encrypts the memory protection key with the bootstrap key using, by way of non-limiting example, cryptographic co-processor 130. The encryption operation may accept the module ID, the random number stored in FROM 115, and other FROM contents as additional data. Alternately, the encryption operation may accept the random number stored in FROM 115 and other FROM contents as additional data and the module ID as the nonce. Thus, the encryption operation of the GCM-AES algorithms produce an encrypted memory protection key and an encryption authentication tag. The bootstrap key and the encryption authentication tag are stored in unencrypted form in NAND flash memory 135. A portion of NAND flash memory 135 is set aside to store data encrypted using the memory protection key. In this manner, the module is provisioned with a secure portion of NAND flash memory 135 that is used to contain protected data. Note that, in some embodiments, the memory protection key never leaves the module in unencrypted form. In some embodiments, the memory protection key never leaves integrated circuit 105.

At block 230, the encrypted memory protection key is passed outside module 100 through SD interface using a special command that is only available in the key generation programming. Alternately, or in addition, the encrypted memory protection key is passed out of the module via JTAG interface 170. The encrypted memory protection key is then returned to module 100 via JTAG interface 170 and stored in FROM 115. Note that in some embodiments, FPGA 110 cannot write to FROM 115, and the only way to store data in FROM 115 is via JTAG physical connectors 175. In such embodiments, passing the encrypted memory protection key outside of module 100 allows it to be stored in FROM 115. Note that the memory protection key never exists outside of the module in an unencrypted form.

At this stage, the module may be transferred to a general operation programming programmer, which may be a different entity from the key generation programming programmer. Alternately, the general operation programming programmer may be the same entity as the key generation programming programmer.

At block 235, general operation programming fabric is installed in FPGA 110. The installation procedure is essentially the same as the installation procedure for the test programming fabric. Thus, a general operating programming fabric key is stored in module 100 (e.g., in FPGA 115 in distributed form), the general operation programming fabric is encrypted using the key, an encryption authentication tag is generated and a file with a header containing the encryption authentication tag is inserted into module 100, which decrypts the general operation programming fabric and stores it in FPGA 110. In alternate embodiment, the key generation programming fabric is used as the general operation programming fabric, i.e., no new fabric is installed as the general operation programming fabric.

In addition, a general operation programming executable is encrypted using memory protection key and stored in NAND flash memory 135. The authentication tag associated with encrypting the general operation programming executable is also stored in nonvolatile memory (e.g., a portion of NAND flash memory 135 that may be encrypted using the memory protection key).

In addition, a boot programming executable associated with the general operation programming is encrypted using the memory protection key and stored in a boot area of NAND flash memory 135. The encryption authentication tag that results from encrypting the boot programming is stored in nonvolatile memory (e.g., FPGA 110, NAND flash memory 135 or FROM 115).

After validating that the general operation programming is operational, at block 240, the data stored in FPGA 110 is made permanent. This may be accomplished via, by way of non-limiting example, blowing antifuses. ACTEL's FuseLock technology may be used to that end. Note that at this stage, at least a portion of the contents of FROM 115, including the encrypted memory protection key, are only internally accessible to module 100.

The boot programming is responsible for loading the general operation programming executable from NAND flash memory 135 to RAM 145 during normal operation. More particularly, each time the module starts up, the module transfers the bootstrap key from NAND flash memory 135 into FPGA 110. There, the bootstrap key is used to decrypt the memory protection key. The decryption operation produces a decryption authentication tag, which is compared to the encryption authentication tag that is stored in NAND flash memory 135. If the tags do not match, operation is halted and the module disables further operations. If the tags match, the decrypted memory protection key is used to decrypt the contents of the boot area of NAND flash memory 135, i.e., the boot programming. Decrypting the boot programming produces a decryption authentication tag, which is compared with the associated encryption authentication tag that is stored in nonvolatile memory.

Again, if the comparison fails, operations are disabled and the start-up process is halted. Otherwise, the module transfers the boot programming executable to RAM 145, where it proceeds to execute. The executing boot programming then causes the general operation programming executable to begin executing. Note that the decrypted memory protection key never leaves module 100 during the process of decrypting the contents of the boot area, or at any other time.

Note that encrypting the memory protection key, which is stored in FROM 115, using the bootstrap key, which is stored in NAND flash memory 135, mitigates against an attack against either of NAND flash memory 135 or FROM 115 alone. An attacker must have both the bootstrap key and the contents of FROM 115 to decrypt the memory protection key, which is required to correctly decrypt the contents of the portion of NAND flash memory 135 whose data is encrypted using the memory protection key.

However, even if an attacker knows the bootstrap key, he or she cannot access the unencrypted memory protection key. More particularly, once the data stored in FPGA 110 and FROM 115 is made permanent, JTAG interface 170 is useless, rendering JTAG physical connector 175 useless as well. Thus, the encrypted memory protection key cannot be read out via JTAG interface 170 and JTAG physical connector 175. Likewise, the encrypted memory protection key cannot be read out via interface 160 and physical connector 165, as the general operation programming provides no commands or other means to access the entire contents of FROM 115 (although the module ID may still be read via physical connectors 165). Thus, to successfully crack the memory protection key, an attacker must somehow gain access to both NAND flash memory 135 (which stores the bootstrap key) and FROM 115 (which stores the encrypted memory protection key).

Note that blocks 210, 215, 230, 235 and 140 may be performed by software external to module 100. Blocks 220 and 225 may be performed by the key generation programming. The external software may automatically invoke the key generation programming at blocks 220 and 225.

Figure 3:
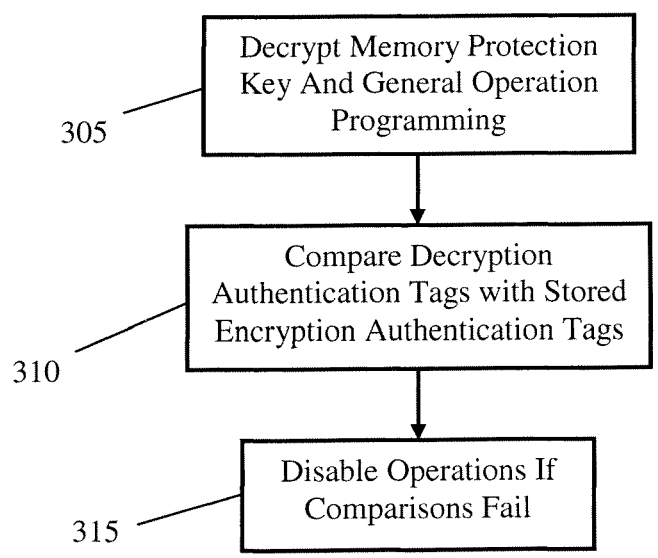
FIG. 3 is a flowchart depicting general operation programming authentication and memory protection key authentication according to an embodiment of the present invention.

FIG. 3 is a flowchart depicting general operation programming authentication and memory protection key authentication according to an embodiment of the present invention. Whenever the module is started (e.g., by applying power), the memory protection key and general operation programming executable are authenticated. This process begins by retrieving the bootstrap key from NAND flash memory 135. At block 305, the memory protection key is decrypted using the bootstrap key. This decryption results in a decryption authentication tag. Thus, at block 310 the decryption authentication tag for the memory protection key is compared with the encryption authentication tag, stored in NAND flash memory 135, for the memory protection key. Likewise, at block 310 the decryption authentication tag for the general operation programming executable is compared with the corresponding encryption authentication tag, which is stored in nonvolatile memory. If either of these comparisons reveal that the encryption tag does not match the decryption tag, at block 315, operations of the module are disabled. In some embodiments, no operations are available if the comparison fails. That is, in some embodiments, a failed comparison at block 315 causes the module to permanently enter "brick mode," that is, provide no operations whatsoever. If the comparisons both result in matches, then the module is available for operations. In particular, the memory protection key may be used to encrypt data written to a portion of NAND flash memory 135.

The installed general operation programming is responsible for initiating and executing the processes described in detail in reference to FIGS. 4-7. Note that some of these processes involve communication with outside entities.

Once the module has authenticated the general operation programming and memory protection key, and once the module is coupled with a device (e.g., a mobile phone), the module may upload to the device software that executes in the device in support of module operations. Such software may be initially stored in the module's nonvolatile memory and may be uploaded to the module along with, by way of non-limiting example, the general operation programming.

Figure 4:
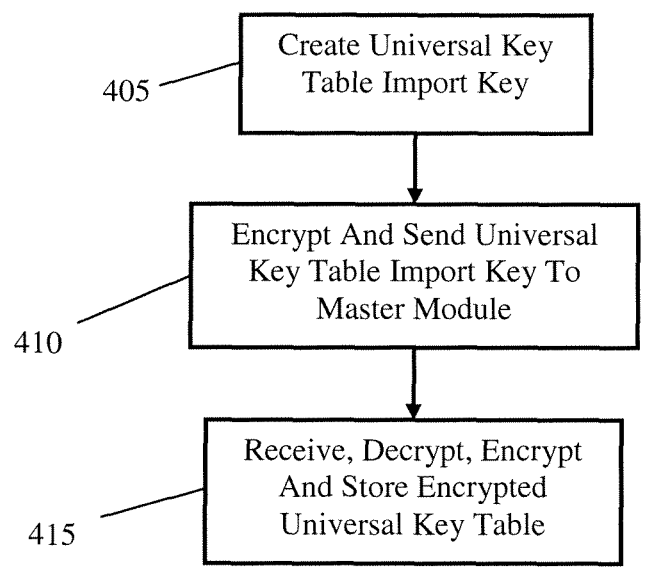
FIG. 4 is a flowchart depicting universal key table provisioning according to an embodiment of the present invention.

FIG. 4 is a flowchart depicting universal key table provisioning according to an embodiment of the present invention. According to some embodiments of the present invention, each module is provisioned with a universal key table, which is identical in each module. Modules may, in general, be provisioned with additional key tables. Note that key tables according to some embodiments of the present invention include a key table identifier and multiple cryptographic keys, each associated with an index. Such indices allow communicating entities to determine whether they are in possession of an identical key by simply communicating the key table's identifier and the key's index, without disclosing the key itself. "Key tables," as that term finds meaning in U.S. Pat. No. 7,325,133 entitled "Mass Subscriber Management" to Fascenda, the disclosure of which is incorporated by reference, may be implemented as the key tables referred to herein in certain embodiments of the present invention. In some embodiments of the present invention, the key tables are accompanied by additional data, such as policy or permission information. As discussed elsewhere herein, each module also contains keys that are unique to that module.

Provisioning a module with the universal key table begins at block 405, where the module internally generates a universal key table import key. The universal key table import key may be generated using the module's random number generator block 150. In some embodiments, the universal key table import key is a 256-bit GCM-AES key.

At block 410, the universal key table import key is encrypted using the public key of a master module. A "master module" is a module as described herein as module 100 in FIG. 1 but that additionally contains a private key of an asymmetric key pair. Such a key pair may be generated using random number generator block 150. The public key of such a key pair is made publicly available, while the private key may be encrypted using the memory protection key and stored in NAND flash memory 135 or FROM 115. Block 410 concludes with the module to-be-provisioned outputting its encrypted universal key table import key.

The output encrypted universal key table import key is received by the master module, which decrypts it using its private key. The master module stores a universal key table using a table protection key, which it also stores, e.g., in the master module's NAND flash memory, encrypted using the master module's memory protection key. The master module encrypts the table protection key using the universal key table import key of the module to be provisioned. If the universal key table has associated permission or policy information, that information may be separately encrypted or encrypted using the same table protection key. The master module then sends the encrypted table protection key and the encrypted universal key table to the module to be provisioned. In some embodiments, the decrypted universal key table import key never exists outside any module, including the master module, in unencrypted form.

In some embodiments, the master module delivers the same universal key table, encrypted using the same table protection key, to every requesting module. In other embodiments, the master module periodically (e.g., daily, weekly or monthly) generates a new table protection key, encrypts the universal key table using the new key, and replaces the previously encrypted universal key table with the newly encrypted universal key table in storage. Over the course of the period, the master module delivers the universal key table encrypted using the same table protection key for that period.

In some embodiments, the master module stores the encrypted universal key table externally, e.g., in a hard drive. In some embodiments, the master module stores all of its key tables externally, e.g., in a hard drive, in encrypted form.

At block 415, the module receives the encrypted universal key table, which is encrypted with the table protection key. The module decrypts the table protection key using its universal key table import key, decrypts the universal key table using the decrypted table protection key, encrypts the universal key table using the memory protection key of the module, and stores the universal key table in the portion of the module's NAND flash memory that is encrypted using the memory protection key of that module. Note that the operations referred to in the previous sentence occur entirely inside of the module.

At this point, the module has access to every key in the universal key table. Accordingly, the module can enable secure communications between a device to which it is operably coupled and any other device that is operably coupled to a module that also contains a copy of the universal key table. In particular, communications between such devices may be encrypted using a shared key that is present in the universal key table. In some embodiments, shared keys form the universal key table are used to exchange random numbers, which are then used to generate keys used to encrypt communications. The keys present in the universal key table may be used to secure communications or authenticate communicating entities as described in U.S. Pat. No. 7,325,134 entitled "Localized Network Authentication And Security Using Tamper-Resistant Keys" to Fascenda, the disclosure of which is incorporated herein.

Figure 5:
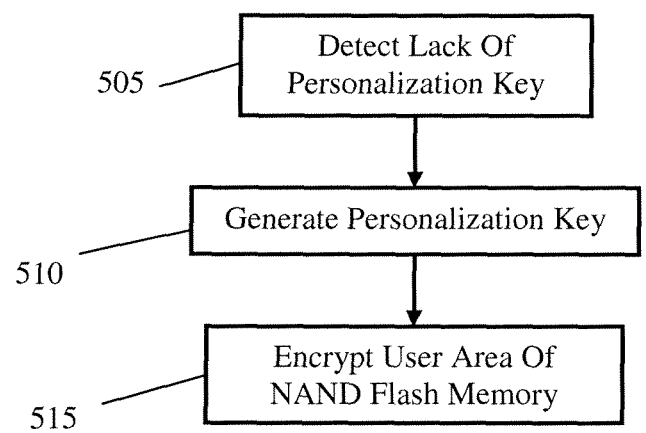
FIG. 5 is a flowchart depicting personalization key provisioning according to an embodiment of the present invention.

FIG. 5 is a flowchart depicting personalization key provisioning according to an embodiment of the present invention. A module's personalization key is, by way of non-limiting example, a GCM-AES key that is used to encrypt a portion of the module's NAND flash memory 135. Thus, after establishing a personalization key as described in reference to FIG. 5, the module's NAND flash memory 135 will include at least two encrypted logically partitioned portions: a portion encrypted using the memory protection key and a portion encrypted using the personalization key, described further below. At block 505, upon initial startup of the module, the general operation programming detects whether a personalization key is present in the portion of NAND flash memory 135 that is encrypted using the memory protection key. If not, at block 510, the module proceeds to generate a personalization key using random number generation block 150.

At block 515, the general operation programming encrypts the contents of the user area of NAND flash memory 135 using the personalization key. Note that the "user area" of NAND flash memory 135 may be accessible when the module is installed into a standard card reader, such as a SD card reader. In general, the user area appears as an external mass storage module (e.g., an "E: Drive"). Thus, encrypting the user area of the module's NAND flash memory 135 protects that area from naïve attacks using standard reader hardware and software. Even if an attacker were to obtain the personalization key by attacking the area of NAND flash memory 135 that contains it in encrypted form, the attacker would still know nothing about the data that is stored in the area of NAND flash memory 135 that is protected by the memory protection key.

Note that, in some embodiments, access via a standard card reader to the user area of NAND flash memory 135 is prevented unless a personal identification number ("PIN") or password is provided. In such embodiments, the PIN or password typically acts to prevent access to the user area, while the personalization key is used to encrypt its contents. In some embodiments, the PIN conforms to the micro SD standard.

Figure 6:
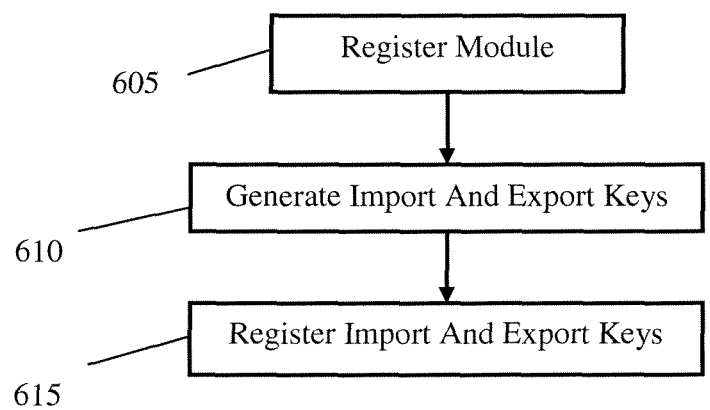
FIG. 6 is a flowchart depicting import key and export key provisioning according to an embodiment of the present invention.

FIG. 6 is a flowchart depicting import key and export key provisioning according to an embodiment of the present invention. The process described in reference to FIG. 6 may occur after the bootstrap key, the memory protection key and the personalization key have been derived and stored. In general, the process of FIG. 6 may occur once the module is in possession of an end user and registered.

Thus, at block 605, the end user registers the module. This may be controlled by software stored in the device to which provisioned modules according to embodiments of the present invention are coupled, e.g., mobile telephones. The end user may be the owner of the module, in which case, the end user may input his or her identification in response to an owner-identification query issued by software installed in the mobile telephone. By way of non-limiting example, the first time an end user connects a module according to an embodiment of the present invention to a mobile telephone, software installed in the mobile telephone securely connects to a master module or a management entity. Such a management entity may be in communication with a master module or have access to a repository of key tables and other information encrypted using parameters of a master module. An exemplary management entity may have a web portal to which the mobile telephone's software connects. The mobile telephone communicates the associated module ID to the master module or management entity, which stores the module ID and other communicated information. If the end user has input owner identification, then such identification is also communicational to the master module or management entity, which stores it in association with the module ID. Otherwise, the master module or management entity may associate the module ID with the management entity as owner.

At block 610, the general operation programming generates two keys: an import key and an export key. By way of non-limiting example, the import key and the export key may each be 256-bit GCM-AES symmetric keys. These keys are encrypted using the memory protection key and stored in the area of NAND flash memory 135 that is protected by that key. At block 615, the two keys are securely sent to a master module, by way of non-limiting example, under encryption using the master module's public key of an asymmetric key pair. The master module stores the import and export keys in its NAND flash memory (or elsewhere, such as an external hard disk drive), encrypted with its own memory protection key. The import key may be subsequently used to encrypt key tables, keys that encrypt key tables, and other information during transfer to the module that generated it. The export key is used to allow the module that generated it to securely transfer data stored in, e.g., the user area of NAND flash memory 135. Any entity that has access to a module, or other repository, that contains the sending module's export key (and that can decrypt it) can decrypt such transferred data. Note that the import and export keys never exist outside any module in unencrypted form.

The user may securely transfer data outside of the user's module to another similarly-provisioned module, a master module, or any storage repository that may or may not be connected to a module. To do so, the module may proceed as follows. First, if necessary, the module decrypts the data to be transferred using, e.g., the user's personalization key. That data is re-encrypted using any shared key, e.g., the module's export key or a shared key. The data is then sent to its destination, along with the sending module's ID and, if necessary, a key table identifier and key index. Any entity that has access to the key that was used to encrypt the data (e.g., the sending module's export key or a shared key) can decrypt the sent data. For example, if data encrypted using the sending module's export key was sent to a storage repository via a web portal, a computer or other device in communication with a master module that has archived the sending module's export key may retrieve the data over the web portal and decrypt it using the export key of the sending module. Thus, data may be securely sent between communication entities in real time or non-real time, e.g., by having the sender send encrypted data to a repository, which the receiver later accesses to retrieve and decrypt the data.

Figure 7:
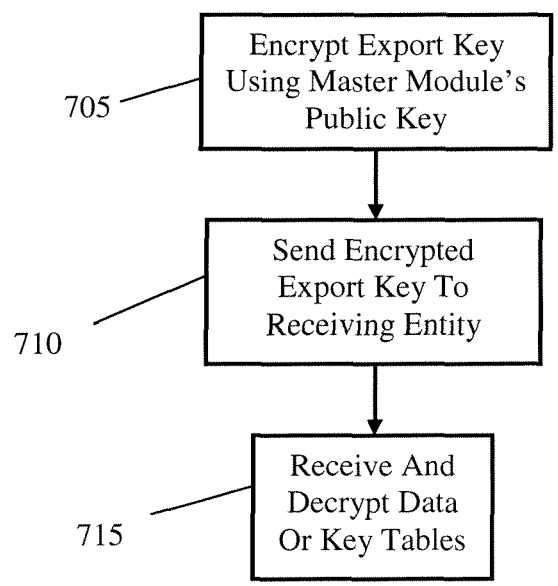
FIG. 7 is a flowchart depicting provisioning a module with additional key tables or data according to an embodiment of the present invention.

FIG. 7 is a flowchart depicting provisioning a module with additional key tables or data according to an embodiment of the present invention. In general, the module may receive the additional key tables or data from a master module or repository. As discussed above in reference to FIG. 6, the master module securely holds a private key of an asymmetric key pair and makes the associated public key publicly available. At block 705, the receiving module decrypts its import key using its memory protection key and then encrypts the import key using the master module's public key. The receiving module sends its encrypted import key to the master module at block 710. The master module uses its private key, which it internally decrypts using its memory protection key, to decrypt the received import key. Note that blocks 705 and 710 may have been previously performed if the master module is one that the receiving module has previously registered with, e.g., using the techniques described in reference to FIG. 6.

The master module or repository then retrieves one or more key tables that were previously encrypted using a table protection key, or other data. The table protection key or data is encrypted using the receiving module's import key and sent to the receiving module. At block 715, the receiving module receives the encrypted key table(s) or data, internally decrypts the data or table protection key using its import key, and then uses the import key to internally decrypt the key tables(s). Finally, the receiving module internally encrypts the additional key table(s) or data using its memory protection key, and stores the encrypted key table(s) or data in the portion of its NAND flash memory that is protected by its memory protection key. Alternately, the receiving module internally encrypts the additional key table(s) or data using its personalization key, and stores the encrypted key table(s) or data in the portion of its NAND flash memory that is protected by its personalization key.

Note that the same procedure of the above paragraph may be used to securely sign data sent between two entities that have access to the appropriate modules. The protocol is changed only by appending signatures to data as opposed to encrypting data, and verifying such signatures instead of decrypting such data.

Note that the master module may internally generate key tables using the master module's random number generator block, encrypt them using the master module's memory protection key, and then store them in the master module's NAND flash memory. Consequently, in this embodiment, the additional key tables never exist in unencrypted form outside of any module. However, encrypted key tables may be transferred between modules or stored in modules or elsewhere.

Some embodiments include additional features. For example, module 100 may include an on-chip oscillator with phase-locked loop ("PLL") control for one or more chip clocks. Module 110 may include separate cryptographic keys for protecting JTAG interface 170, FPGA 110 and FROM 115. Such a progressive security mechanism helps thwart attacks that result in acquiring less than all three keys. Processor 125 (e.g., ARM Cortex-M1 CPU) may be equipped with the ability to enter a no-power or low-power state, such as a sleep mode.

Certain disclosure herein refers to modules sending or receiving executables, fabrics, keys or other data. In some embodiments, such communications may be performed in concert with hardware to which such modules are operatively coupled. By way of non-limiting example, such hardware includes mobile telephones, personal digital assistants and networked computers. The communications may be sent and received over communications channels such as, by way of non-limiting example, cellular telephone networks, the Internet, local area networks ("LAN") and wide area networks ("WAN").

In some embodiments, executables, fabrics, keys or other data may be stored on one or more computer readable media, such as, by way of non-limiting example, flash memory, magnetic disk or optical disk. Such executables, fabrics, keys or other data may be transferred between entities by transferring the computer readable media on which they are stored.

In some embodiments, any number of different entities may perform any of the provisioning steps described herein.

In some embodiments, the modules are returned to the base provisioning entity to have one or more of the following keys installed at the appropriate stage: test programming fabric key, test programming executable key, key generation programming fabric key, key generation programming executable key and general operation programming fabric key. The base provisioning entity may then deliver the modules to the appropriate programming entity for that stage, together with the properly encrypted programming. Note that in such embodiments, the programmer does not have access to the programming in unencrypted form, and cannot retrieve from the module the key(s) necessary to decrypt the encrypted programming it receives from the base provisioning entity.

In alternate embodiments, one or more of the following keys may be supplied separately from its associated programming: test programming fabric key, test programming executable key, key generation programming fabric key, key generation programming executable key, general operation programming fabric key and memory protection key. Such separate delivery may occur via separate electronic messages (e.g., email or file transfer protocol), separate physical deliveries (e.g., via mail carrier), or a combination. For example, the test programming fabric key may be stored on a magnetic disk and sent by courier to the test programming programmer or another entity that inserts the key into the module, and the encrypted test programming fabric may be made available at a web portal in file transfer protocol format for the test programming programmer to download.

Unless otherwise stated, any of the cryptographic keys referred to herein may be symmetric or asymmetric. By way of non-limiting example, any of the cryptographic keys referred to herein may have the following number of bits: 128, 256, 512, 1024 and 2048. Any of the cryptographic keys referred to herein may be used for, by way of non-limiting example, cryptographic operations using a GCM-AES algorithm.

Some embodiments of the present invention replace FPGA 110 with an application specific integrated circuits ("ASIC"). In such embodiments, a single physical connector may be used to insert programming and to interface with the module for cryptographic operations.

Types of nonvolatile memory that are suitable for use in embodiments of the present invention include, by way of non-limiting example, ROM, NOR memory, PROM, EPROM and EEPROM. For example, any type of nonvolatile memory may be used in addition to, or instead of NAND flash memory 135.

Other embodiments, uses, and advantages of the present invention will be apparent to those skilled in the art from consideration of the specification and practice of the present invention disclosed herein. The specification and drawings should be considered exemplary only.

We claim:

1. A method of provisioning a memory card with cryptographic parameters, wherein the memory card comprises a field programmable gate array (FPGA), a first nonvolatile memory, a second nonvolatile memory, and a cryptographic coprocessor, the method comprising:
    storing a key generating programming fabric in the FPGA;
    storing a module identification and a random seed in the first nonvolatile memory;
    executing the key generation program to generate a bootstrap key and a memory protection key when the key generating program fabric is determined to be secure, wherein the bootstrap key and the memory protection key are generated using at least one of: the module identification and the random seed;
    encrypting, using the key generating programming fabric, the memory protection key with the bootstrap key using the cryptographic coprocessor to produce an encrypted memory protection key and an encryption authentication tag, wherein the encrypted memory protection key and the encryption authentication tag are stored in the second nonvolatile memory, wherein the encryption authentication tag is compared to a decrypted authentication tag that is generated from decrypting the encrypted memory protection key to determine disablement of one or more operations of the memory card; and
    passing the encrypted memory protection key outside the memory card using the key generating programming fabric.

2. The method of claim 1, wherein the stored key generating programming fabric includes: an externally encrypted key generating programming fabric, wherein the encrypted key generation programming fabric includes a header with a key generation authentication tag, and a key generation programming fabric key.

3. The method of claim 2, wherein determining that the key generating programming fabric is secure comprises:
    decrypting the encrypted key generation programming fabric using the cryptographic coprocessor and the stored key generation programming fabric key to generate a key generation decryption authentication tag;
    comparing the key generation authentication tag and the key generation decryption authentication tag; and
    determining that the key generating program fabric is secure when the key generation authentication tag and the key generation decryption authentication tag match.

4. The method of claim 1, wherein the first nonvolatile memory resides in an integrated circuit within the memory card and the second nonvolatile memory resides outside of the integrated circuit within the memory card.

5. The method of claim 1 further comprising:
    receiving the passed encrypted memory protection key; and
    storing the received encrypted memory protection key in the first nonvolatile memory.

6. The method of claim 1 further comprising:
    storing an encrypted general operating programming fabric in the FPGA;
    storing a general operating programming fabric key in the FPGA;
    determining that the encrypted general operating programming fabric is secure;
    decrypting the general operation programming fabric when it is determined that the encrypted general operating programming fabric is secure; and
    storing the decrypted general operating programming fabric in the FPGA.

7. The method of claim 6, wherein determining that the encrypted general operating programming fabric is secure comprises:
    decrypting the encrypted general operation programming fabric using the cryptographic coprocessor and the stored general operation programming fabric key to generate a general operation decryption authentication tag;
    comparing a general operation authentication tag and the general operation decryption authentication tag; and
    determining that the general operation program fabric is secure when the general operation authentication tag and the general operation decryption authentication tag match.

8. The method of claim 6, further comprising:
    encrypting a general operation programming executable using the memory protection key; and
    storing the encrypted general operation programming executable in the second nonvolatile memory.

9. The method of claim 8, further comprising:
    encrypting a boot programming executable associated with the general operation programming fabric using the memory protection key; and
    storing the encrypted boot programming executable in the second nonvolatile memory.

10. The method of claim 9, wherein the encrypted boot programming executable is stored in a boot portion of the second nonvolatile memory.

11. The method of claim 6, further comprising:
    validating that the general operation programming fabric is operational; and
    securing the data stored in the FPGA in a permanent manner.

12. The method of claim 11, wherein the data stored in the FPGA is secured in a permanent manner by blowing antifuses.

13. A system for provisioning a memory card with cryptographic parameters, wherein the memory card comprises a field programmable gate array (FPGA), a first nonvolatile memory, a second nonvolatile memory, and a cryptographic coprocessor, the system comprising:
   a processor that performs the following steps:
      storing a key generating programming fabric in the FPGA;
      storing a module identification and a random seed in the first nonvolatile memory;
      executing the key generation program to generate a bootstrap key and a memory protection key when the key generating program fabric is determined to be secure, wherein the bootstrap key and the memory protection key are generated using at least one of: the module identification and the random seed;
      encrypting, using the key generating programming fabric, the memory protection key with the bootstrap key using the cryptographic coprocessor to produce an encrypted memory protection key and an encryption authentication tag, wherein the encrypted memory protection key and the encryption authentication tag are stored in the second nonvolatile memory, wherein the encryption authentication tag is compared to a decrypted authentication tag that is generated from decrypting the encrypted memory protection key to determine disablement of one or more operations of the memory card; and
      passing the encrypted memory protection key outside the memory card using the key generating programming fabric.

14. The system of claim 13, wherein the stored key generating programming fabric includes: an externally encrypted key generating programming fabric, wherein the encrypted key generation programming fabric includes a header with a key generation authentication tag, and a key generation programming fabric key.

15. The system of claim 14, wherein determining that the key generating programming fabric is secure comprises:
   decrypting the encrypted key generation programming fabric using the cryptographic coprocessor and the stored key generation programming fabric key to generate a key generation decryption authentication tag;
   comparing the key generation authentication tag and the key generation decryption authentication tag; and
   determining that the key generating program fabric is secure when the key generation authentication tag and the key generation decryption authentication tag match.

16. The system of claim 13, wherein the first nonvolatile memory resides in an integrated circuit within the memory card and the second nonvolatile memory resides outside of the integrated circuit within the memory card.

17. The system of claim 13, wherein the process further performs the following steps:
   receiving the passed encrypted memory protection key; and
   storing the received encrypted memory protection key in the first nonvolatile memory.

18. The system of claim 13 wherein the process further performs the following steps:
   storing an encrypted general operating programming fabric in the FPGA;
   storing a general operating programming fabric key in the FPGA;
   determining that the encrypted general operating programming fabric is secure;
   decrypting the general operation programming fabric when it is determined that the encrypted general operating programming fabric is secure; and
   storing the decrypted general operating programming fabric in the FPGA.

19. The system of claim 18, wherein determining that the encrypted general operating programming fabric is secure comprises:
   decrypting the encrypted general operation programming fabric using the cryptographic coprocessor and the stored general operation programming fabric key to generate a general operation decryption authentication tag;
   comparing a general operation authentication tag and the general operation decryption authentication tag; and
   determining that the general operation program fabric is secure when the general operation authentication tag and the general operation decryption authentication tag match.

20. The system of claim 18, f wherein the process further performs the following steps:
   encrypting a general operation programming executable using the memory protection key; and
   storing the encrypted general operation programming executable in the second nonvolatile memory.

21. The system of claim 20, wherein the process further performs the following steps:
   encrypting a boot programming executable associated with the general operation programming fabric using the memory protection key; and
   storing the encrypted boot programming executable in the second nonvolatile memory.

22. The system of claim 21, wherein the encrypted boot programming executable is stored in a boot portion of the second nonvolatile memory.

23. The system of claim 18, wherein the process further performs the following steps: validating that the general operation programming fabric is operational; and
   securing the data stored in the FPGA in a permanent manner.

24. The system of claim 23, wherein the data stored in the FPGA is secured in a permanent manner by blowing antifuses.

* * * * *